Feb. 7, 1961   G. H. GRIFFITH ET AL   2,970,323
AUTOMOBILE BUNK
Filed April 15, 1959   2 Sheets-Sheet 2
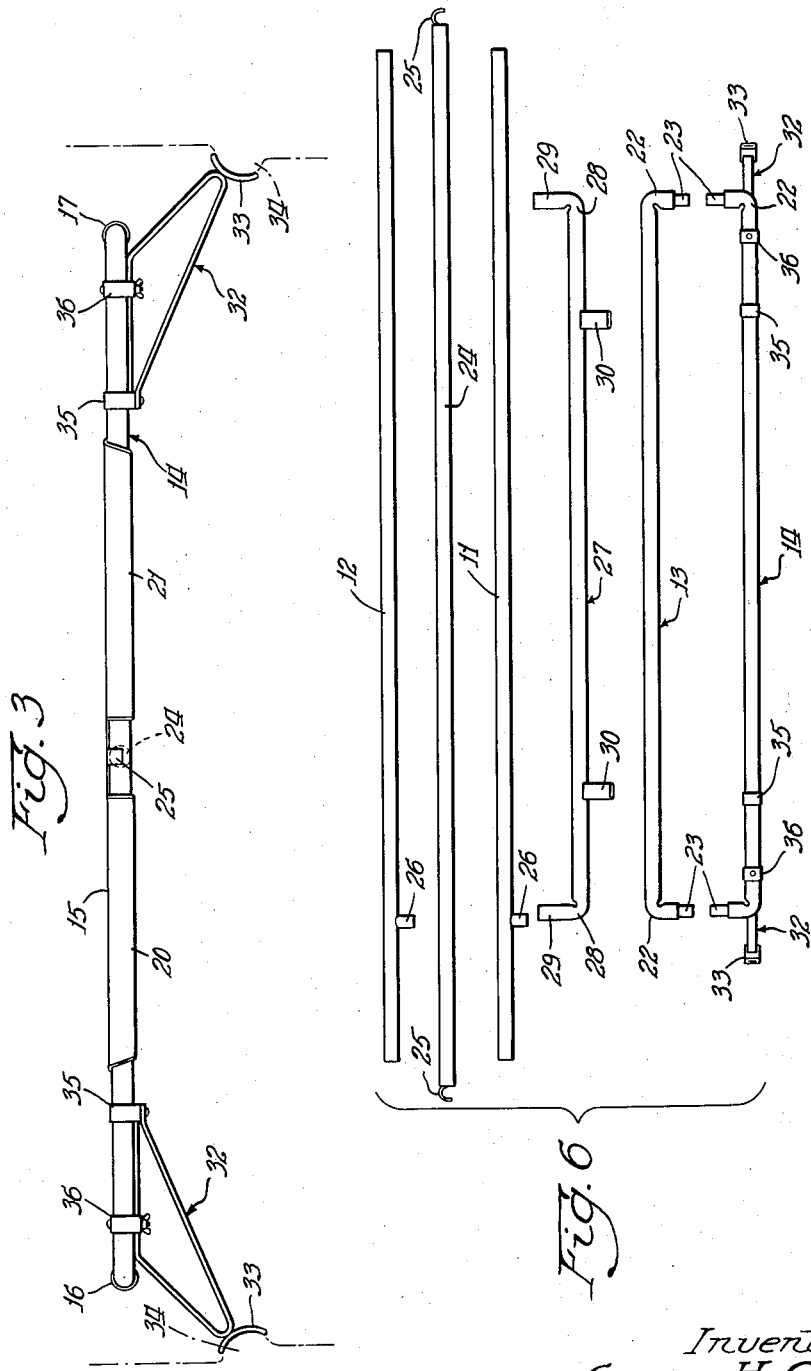

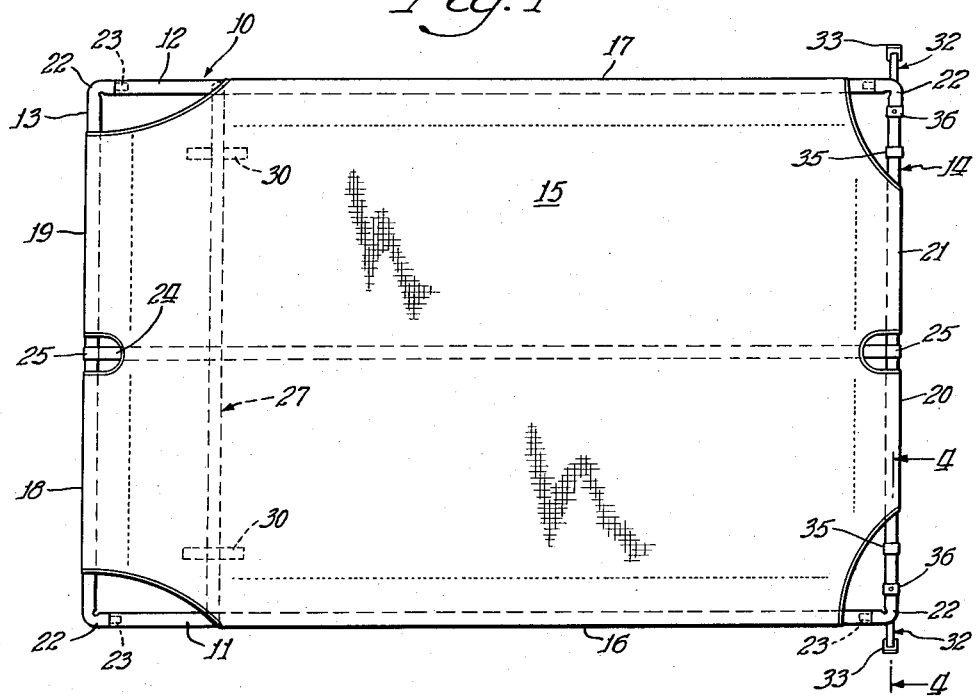

United States Patent Office 2,970,323
Patented Feb. 7, 1961

2,970,323
AUTOMOBILE BUNK

George H. Griffith, 237 E. Crescent, Elmhurst, Ill., and Richard T. Griffith, 6022 Sherwin, Chicago, Ill.

Filed Apr. 15, 1959, Ser. No. 806,582
3 Claims. (Cl. 5—118)

This invention relates to bunks for automobiles and more particularly to bunks that are designed for use in a station wagon type of automobile. Station wagons are coming into use more and more for vacation purposes and consequently a bunk that is readily assembled and disassembled and properly designed for convenient use in a station wagon is highly desirable.

It is therefore an object of this invention to provide a bunk which is readily assembled and disassembled and capable of compact storage.

It is another object of this invention to provide a bunk for a station wagon, the front end of which is supported on the back rest of a seat and the back end of which is supported on side ledges on the inside of the station wagon.

It is a further object to provide a bunk for automobiles which is so constructed so that the space inside the automobile below the bunk is available in toto for storage or lower sleeping quarters, or other purposes.

It is still another object of this invention to provide a bunk for automobiles with adjustable support means whereby it is made adaptable to fit different makes of automobiles and particularly station wagons.

It is also an object to provide a bunk for automobiles which is simple and rigid in construction and low in manufacturing cost.

This invention consists of the novel constructions, arrangements and devices to be hereinafter described and claimed for carrying out the above-stated objects and such other objects as will be apparent from the following description of a preferred form of this invention, illustrated with reference to the accompanying drawings, wherein:

Figure 1 is a top view of the assembled bunk showing the fabric structure supported by the frame, and other parts;

Figure 2 is a side view of the bunk showing one of the side rails of the frame and front and rear legs;

Figure 3 is a view of the rear end bar of the frame showing adjustable legs having feet of arcuate configuration in engagement with ledges on the inside of an automobile body;

Figure 4 is an enlarged cross section view taken on line 4—4 of Figure 1;

Figure 5 is an enlarged cross section view taken on line 5—5 of Figure 4; and,

Figure 6 shows the various pieces making up the frame structure of the bunk.

Like characters of reference designate like parts in the several views.

Referring now to the drawings the asembled bunk is shown to comprise a frame 10 having tubular side rails 11 and 12, and tubular end bars 13 and 14, supporting a fabric structure 15 which is provided with loops 16 and 17 which receive tubular side rails 11 and 12 respectively and loops 18 and 19 which receive the tubular end bar 13, and loops 20 and 21 which receive the tubular end bar 14. The tubular end bars 13 and 14 have substantially right angle turns 22 at their ends which are provided with lugs 23 that fit telescopically into the ends of the tubular side rails 11 and 12 thereby producing the frame 10 which supports the fabric structure 15 by means of its engagement with the loops 16, 17, 18, 19, 20 and 21. A center bar 24 is snapped into position over the tubular end bars 13 and 14 between the loops 18 and 19 and the loops 20 and 21, respectively, by U-shaped hooks 25 thereby locking the telescopic engagement between the tubular end bars 13 and 14 and the tubular side rails 11 and 12. Each of the tubular side rails 11 and 12 is provided with a downwardly depending lug 26 for telescopically mounting tubular cross bar 27 by means of substantially right angle turns 28 at its ends. The tubular cross bar 27 is also provided with a pair of depending legs 29 having feet 30 of arcuate configuration for engagement with the top of a seat back rest 31.

The tubular end bar 14 is provided with a pair of obliquely depending triangular legs 32 having feet 33 of arcuate configuration for engaging a ledge 34 on the inside of a station wagon. Each triangular leg 32 is adjustably attached to the under side of the tubular end bar 14 by a sliding clip 35 which encompasses the tubular end bar 14 and a stationary clip 36 which encompasses both the tubular end bar 14 and a top side 37 of the triangular leg 32. The sliding clip 35 is attached to the remote end of the triangular leg 32 by a screw 38 and the stationary clip 36 is provided with holes 39 through both walls which match holes 40 through both walls of the tubular end bar 14 and any one of a series of adjusting holes 41 in the top side 37 of the triangular leg 32. A locking bolt 42 having a wing nut 43 is provided for engaging the holes 39, 40 and one of the adjusting holes 41 for locking the triangular leg 32 in the position to which it has been adjusted.

The disassembled automobile bunk comprises the tubular end bar 14 extending through the loops 20 and 21 of the fabric structure 15 with the legs 32 attached as shown in Figure 3, and the tubular side rails 11 and 12, the tubular end bar 13, the center bar 24 and the tubular cross bar 27 with its legs 29. In order to form a compact package for storage all these components may be placed in alignment with the tubular end bar 14 and the fabric structure 15 then wrapped around them thus forming a rolled up package. It may be preferable however to leave the tubular cross bar 27 out of the rolled up package and place it on top with its arcuate feet resting on the roll.

The automobile bunk may be completely assembled before mounting it in most station wagons, however if it cannot be mounted in the station wagon in its assembled condition it may be assembled in the station wagon and then mounted in position.

To assemble the automobile bunk from the components in the above mentioned package the tubular side rails 11 and 12 are passed through the loops 16 and 17 respectively and the tubular end bar 13 is then inserted through the loops 18 and 19, after which the lugs 23 of the tubular end bars 13 and 14 are inserted in the respective ends of the tubular side rails 11 and 12 thus completing the frame 10 supporting the fabric structure 15. The center bar 24 is then snapped into position as shown in Figure 1 thereby providing additional strength and serves to prevent the tubular end bars 13 and 14 from becoming disengaged from the tubular side rails 11 and 12 and further serves to divide the bunk into two areas. Finally, the tubular cross bar 27 with its legs 29 is fixed to the tubular side rails 11 and 12 by telescopic engagement of its turned ends 28 with the lugs 26. It is contemplated that the fabric structure 15, preferably canvass, is of a size so that when the frame 10 is completely assembled except for one of the tubular end bars it must be stretched when the remaining tubular end bar is telescopically engaged with the remaining ends of the tubular side rails 11 and 12 thus providing desirable tautness and tends to keep the tubular end bars 13 and 14 in engagement with the tubular side rails 11 and 12.

The bunk is now ready to be mounted in the station wagon. The procedure is very simple. The front end of the bunk is placed over the back rest of the front seat of the station wagon with arcuate feet 30 resting thereon. The triangular legs 32 are then adjusted and fastened so that the arcuate feet 30 rest in engagement with side ledges on the inside of the station wagon. The bunk is now firmly supported; the front end resting on the back rest of the front seat and the rear end supported by the obliquely extending legs 32 with their arcuate feet 33 in firm engagement with side ledges (usually convex) on the inside of the station wagon. Because of the angularity of the legs 32, any weight placed on the bunk will intensify the supporting engagement between the legs 32 and the side ledges. (We) I wish it to be understood that the invention is not to be limited to the specific constructions and arrangements shown and described, except only insofar as the claims may be so limited, as it will be apparent to those skilled in the art that changes may be made without departing from the principles of the invention.

We claim:

1. An automobile bunk for mounting on the inside of an automobile body, said body having ledges on the sides of the inside thereof and a forward seat having a back rest, the said automobile bunk comprising a frame having a pair of side rails and first and second end bars supporting a fabric structure therebetween, said end bars having substantially right angle turns at their ends for telescopic connection with the respective ends of said side rails whereby said frame may be readily assembled and disassembled, the improvement comprising a pair of legs, one each of which depends obliquely from each end of said first end bar, a pair of arcuate feet attached one each to each of said legs, said feet engaging said ledges partially on the top and partially on the sides thereof, thereby providing a wedging action between the said legs and the respective ledges under the influence of weight provided by said bunk whereby said bunk is rigidly supported at one end thereof, means for lateral adjustment of said legs, and means for supporting the other end of said bunk on said back rest.

2. An automobile bunk for mounting on the inside of an automobile body, said body having ledges on the sides of the inside thereof and a forward seat having a back rest, the said automobile bunk comprising a frame having a pair of side rails and first and second end bars supporting a fabric structure therebetween, said end bars having substantially right angle turns at their ends for telescopic connection with the respective ends of said side rails whereby said frame may be readily assembled and disassembled, the improvement comprising a pair of legs, one each of which depends obliquely from each end of said first end bar, a pair of arcuate feet attached one each to each of said legs, said feet engaging said ledges partially on the top and partially on the sides thereof, thereby providing a wedging action between the said legs and the respective ledges under the influence of weight provided by said bunk whereby said bunk is rigidly supported at one end thereof, means for lateral adjustment of said legs, a center bar extending medially between said pair of side rails and connected at its ends to said end bars by means of U-shaped hooks, and means for supporting the other end of said bunk on said back rest.

3. An automobile bunk for mounting on the inside of an automobile body, said body having ledges on the sides of the inside thereof and a forward seat having a back rest, the said automobile bunk comprising a frame having a pair of side rails and first and second end bars supporting a fabric structure therebetween, said end bars having substantially right angle turns at their ends for telescopic connection with the respective ends of said side rails whereby said frame may be readily assembled and disassembled, the improvement comprising a pair of legs, one each of which depends obliquely from each end of said first end bar, a pair of arcuate feet attached one each to each of said legs, said feet engaging said ledges partially on the top and partially on the sides thereof, thereby providing a wedging action between the said legs and the respective ledges under the influence of weight provided by said bunk whereby said bunk is rigidly supported at one end thereof, means for lateral adjustment of said legs, a center bar extending medially between said pair of side rails and connected at its ends to said end bars by means of U-shaped hooks, a pair of downwardly depending lugs one each connected to each of said side rails, a tubular cross bar having substantially right angle turns for telescopic engagement with said depending lugs, a pair of depending legs connected to said cross bar for engaging said back rest to thereby support the other end of said bunk.

References Cited in the file of this patent
UNITED STATES PATENTS

| | | |
|---|---|---|
| 1,316,662 | Winzeler | Sept. 23, 1919 |
| 1,340,015 | Claflin | May 11, 1920 |
| 1,566,222 | Line | Dec. 15, 1925 |
| 1,676,987 | Line | July 10, 1928 |
| 1,722,916 | Heumader | July 30, 1929 |
| 1,724,162 | Young | Aug. 13, 1929 |
| 2,691,783 | Macaulay | Oct. 19, 1954 |